(12) United States Patent
Parthasarathy et al.

(10) Patent No.: US 7,273,557 B2
(45) Date of Patent: Sep. 25, 2007

(54) METHOD FOR ADSORPTION AND REDUCTION OF HEXAVALENT CHROMIUM BY USING FERROUS-SAPONITE

(75) Inventors: Gopalakrishnarao Parthasarathy, Hyderabad (IN); Bojja Sreedhar, Hyderabad (IN); Boyapati Manoranjan Choudhary, Hyderabad (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 11/036,587

(22) Filed: Jan. 14, 2005

(65) Prior Publication Data
US 2006/0016757 A1 Jan. 26, 2006

Related U.S. Application Data

(63) Continuation of application No. 10/815,546, filed on Mar. 31, 2004, now abandoned.

(51) Int. Cl.
*C02F 1/28* (2006.01)
*C02F 1/70* (2006.01)

(52) U.S. Cl. ............... 210/688; 210/757; 210/913

(58) Field of Classification Search ........... 210/684, 210/688, 913, 757
See application file for complete search history.

(56) References Cited

OTHER PUBLICATIONS

G. Parthasarathy, et al., "Ferrous saponite from the Deccan Trap, India, and its application in adsorption and reduction of hexavalent chromium," American Mineralogist, vol. 88, pp. 1983-1988 (2003).*
G. Parthasarathy, et al., "Reduction of hexavalent chromium by natural iron-rich saponite," Goldschmidt Conference Abstracts, p. A376 (2003).*
Blowes, Science, v 295, pp. 2024 (2002).
Taylor et al., Clays and Clay Minerals, v 48, pp. 648 (2000).
Drljaca et al., Inorg. Chemistry, v 31, pp. 4894 (1992).
Kim et al., environmental Geology, v 42, pp. 642 (2002).

* cited by examiner

*Primary Examiner*—Matthew O. Savage

(74) *Attorney, Agent, or Firm*—Darby & Darby

(57) ABSTRACT

The present invention relates to the development of an improved methodology for adsorption and subsequent reduction of hexavalent chromium aimed at the total removal of hexavalent chromium in water, which comprises, reacting dichromate solutions with natural ferrous-saponite clays at temperature 50 to 200° C. for the period of 1 to 3.0 hours.

10 Claims, 1 Drawing Sheet

Figure 1:
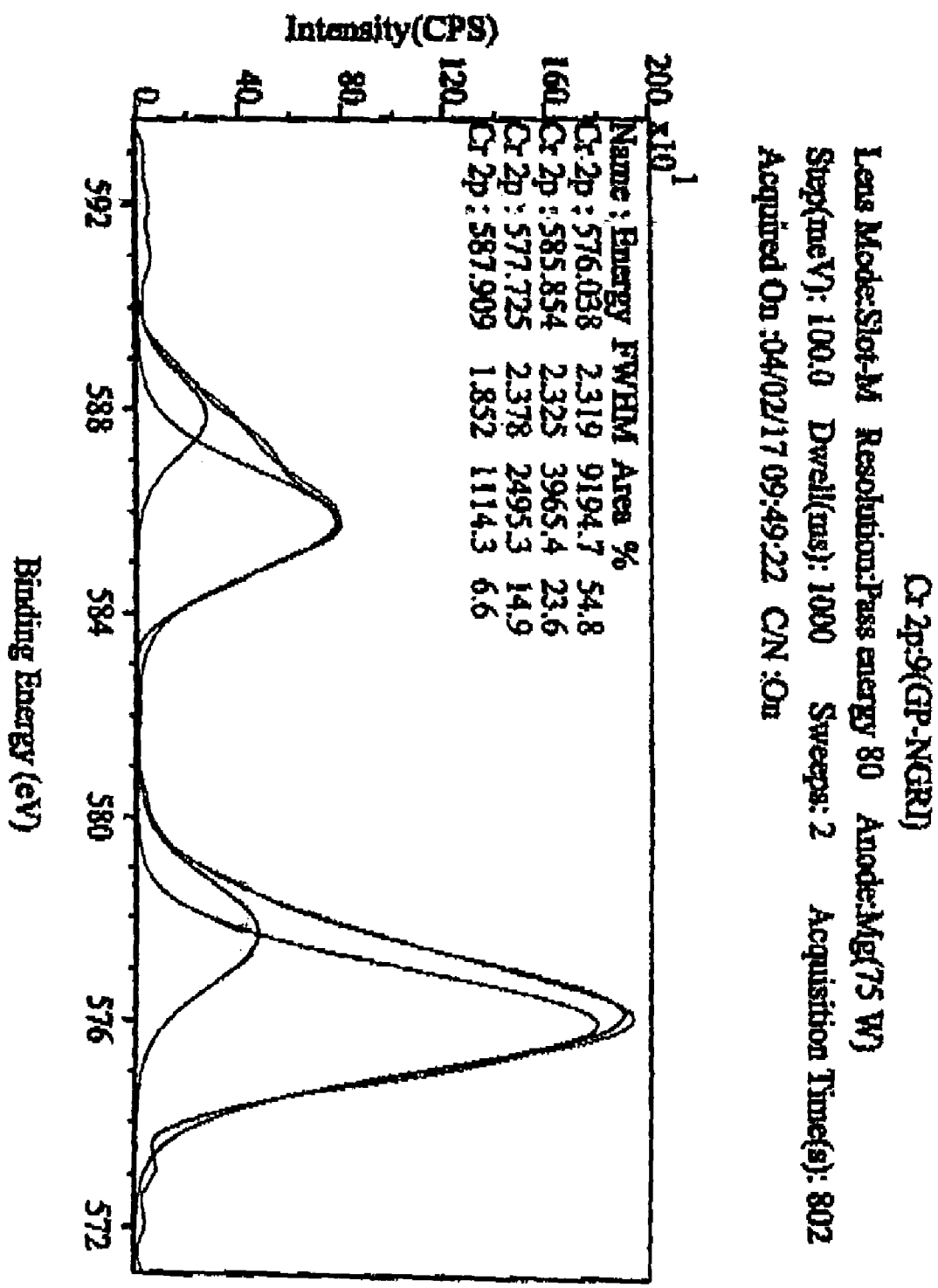

METHOD FOR ADSORPTION AND REDUCTION OF HEXAVALENT CHROMIUM BY USING FERROUS-SAPONITE

The present application is a continuation of U.S. patent application Ser. No. 10/815,546, filed Mar. 31, 2004, now abandoned, which is incorporated herein by reference in its entirety.

FIELD OF THE INVENTION

The present invention relates to the development of an improved methodology for adsorption and subsequent reduction of hexavalent chromium aimed at the total removal of hexavalent chromium in water, which comprises, reacting dichromate solutions with natural ferrous-saponite clays at temperature 50 to 200° C. for the period of 1 to 3.0 hours.

BACKGROUND INFORMATION

Clean water is one of the most fundamental resources for human kind. In reality the ground water gets contaminated with various contaminants. Chromium is one of the very common contaminants, as it is released as effluents from industries of electroplating, leather taming, and corrosion protection. Chromium exists in several valence states viz., Cr (VI) and Cr (III). The hexavalent chromium (Cr (VI)) in ground waters is known to be environmentally hazardous (Blowes, 2002 Science v 295, 2024). Chromium (VI) is highly toxic and mobile whereas Cr (III) is insoluble and nutrient in small amount and not hazardous.

Reference may be made to a publication by Taylor et al., 2000, Clays and Clay Minerals, v48, 648, wherein the hexavalent chromium is reduced by dithionate clays. The major drawbacks are that Chromium ions are adhered to sodium dithionate which can be washed of freely and the compilation of inadequate data in terms of its application.

Reference may be made to a publication by DrIjaca et al. 1992, Inorg. Chemistry, v31, 4894, wherein the trivalent Cr is strongly sorbed by montmorillonite, for the effective removal of Cr from pollutant environments. The drawback is the technique deals only with trivalent Cr, which are less toxic compared to the hexavalent Cr.

References may be made to publication by Kim et al., 2002, Environmental Geology, v42, 642 wherein the reduction of hexavalent chromium is effected by hydrothermally altered andesite containing 11.8% of pyrite. The draw backs are that pyrite-rich andesite is an effective reductant only in KCl and $K_2SO_4$ and also the absence of data on the quantity of reduced chromium in that publication.

References may be made to publication by Parthasarathy et al. 2003, American Mineralogist, V 88, 1983, also Patent 0272 DEL2003 fled during 2002, wherein the possible reduction of hexavalent chromium is discussed. The draw backs are that they do not describe any techinical detail of the conversion and the maximum conversion is about 50 to 60 wt %.

OBJECTS OF THE INVENTION

The main object of the present invention is to provide an improved methodology for the adsorption and reduction and of hexavalent chromium present in the water which comprises reacting aqueous dichromate solutions with ferrous saponite clays at temperature 50 to 200° C. for the period of 1.0 to 3.0 hours.

Another object of the present invention is that ferrous-saponite composed of the formula $\{Na_{0.60}K_{0.40}Ca_{0.47}\}[Mg_{2.05}Fe^{2+}{}_{3.95}](Si_{6.45}Al_{1.55})O_{20}(OH)_4$.

Another object of the present invention is that the particle size of the saponite clay is in the range of 0.1-5 μm.

Another object of the present invention is that the clay fraction was separated by centrifuging and filtration.

Another object of the present invention is the simultaneous adsorption and reduction of hexavalent chromium.

Still another object of the present invention is the use of the dichromate solution 0.04 M.

Yet another object of the present invention is the reaction is effected at a temperature in the range of 50 to 200° C. for the period of 1 to 3 hours.

SUMMARY OF THE INVENTION

The novelty of the present invention lies in the use of natural fine powdered ferrous-saponite for adsorption and reduction of hexavalent chromium, which would help in environmental management. This method provides a very simple procedure, which does not require any expensive chemicals.

The sample has the chemical formula $\{Na_{0.60}K_{0.40}Ca_{0.47}\}[Mg_{2.05}Fe^{2+}{}_{3.95}](Si_{6.45}Al_{1.55})O_{20}(OH)_4$, indicating presence of only ferrous iron in the sample When the sample is treated with the 0.04 M potassium dichromate solution at 50 to 200° C. for the period of 1 to 3.0 hours, the hexavalent chromium gets simultaneously adsorbed by cationic exchange and converted into a less toxic trivalent chromium.

BRIEF DESCRIPTION OF THE DRAWTNGS

FIG. 1 is an XPS spectrum showing adsorption and reduction of chromium VI to chromium III by a ferrous-saponite clay having the formula $\{Na_{0.60}K_{0.40}Ca_{0.47}\}[Mg_{2.05}Fe^{2+}{}_{3.95}](Si_{6.45}Al_{1.55})O_{20}(OH)_4$.

DETAILED DESCRIPTION OF THE INVENTION

Accordingly, the present invention provide an improved methodology for adsorption and subsequent reduction of hexavalent chromium aimed at the removal of chromium in water, which comprises, reacting dichromate solutions with ferrous-saponite clays at temperature 50 to 200° C. for the period of 1 to 3.0 hours.

In an embodiment of the present invention the ferrous-saponite used is composed of the formula $\{Na_{0.60}K_{0.40}Ca_{0.47}\}[Mg_{2.05}Fe^{2+}{}_{3.95}](Si_{6.45}Al_{1.55})O_{20}(OH)_4$, contains orrly ferrous iron in the octahedral site.

In another embodiment of the present invention is the simultaneous adsorption and reduction of hexavalent chromium.

In another embodiment of the present invention is that the particle size of the ferrous-saponite clay is in the range of 0.1-5 μm In another embodiment of the present invention is that the clay fraction was separated by centrifuging and filtration.

In another embodiment of the present invention, the concentration of the dichromate solution is 0.04 M.

In another embodiment of the present invention the reaction is effected at a temperature in the range of 50 to 200° C. for 1 to 3.0 hours.

Scientific Explanation

In the present invention, we have used natural ferrous-saponite with the chemical formula $\{Na_{0.60}K_{0.40}Ca_{0.47}\}[Mg_{2.05}Fe^{2+}_{3.95}](Si_{6.45}Al_{1.55})O_{20}(OH)_4$, containing only ferrous iron. The sample has been formed at reducing condition. Ferrous-saponite containing Fe (II) can immobilize the chromium on the mineral surface and also reduce Cr (VI) to Cr (III) due to the electron transfer mechanism. Adsorption of hazardous Cr (VI) by the Fe (II)-containing clay was a prerequisite for the coupled sorption reduction reaction. The capacity of clays to reduce Cr (VI) are correlated with the ferrous iron content of the clays. When. Cr (VI) reduces by Fe(II), 3 mol of Fe(II) need to reduce 1 mol of Cr(VD) to Cr(III).

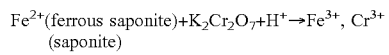
(saponite)

When the temperature is increased beyond 200° C., the ferrous saponite transforms into ferric saponite and the ferric saponite can only adsorp but will not be able to reduce the Cr (VI).

The following examples are given by way of illustration of the present invention and therefore should not be construed to limit the scope of the invention.

EXAMPLE 1

Sample Preparation and Characterization:

The clay mineral was scooped out from the walls of the amygdales. It is apple green to dull pale green in colour and is soapy to touch. The material was ground in ethanol medium in porcelain mortar to avoid any oxidation during sample preparation and preserved in air tight polythene viols. The chemical composition of the samples was determined by EPMA and Hitachi S-520 SEM in EDAX mode with a filament current of 110 microamperes and an accelerating voltage of 20 kV. Ferrous iron content was separately determined by titrimetric method following the method by Wilson (1960). The composition of the sample is given in the table. 1

TABLE 1

Chemical composition of the clay samples from the Killari borehole.

| | 222.5 meters (N = 4) | | 300.15 meters (N = 4) | |
|---|---|---|---|---|
| Sample Oxides | Weight (wt %) | Cations (22 Oxygen) | Weight (wt %) | Cations (22 Oxygen) |
| $SiO_2$ | 35.70 | 6.388 | 37.20 | 6.508 |
| $Al_2O_3$ | 7.48 | 1.578 | 7.36 | 1.516 |
| FeO | 26.80 | 4.010 | 25.82. | 3.884 |
| MgO | 7.80 | 2.075 | 7.74 | 2.018 |
| CaO | 2.40 | 0.462 | 2.52 | 0.472 |
| $Na_2O$ | 1.66 | 0.576 | 1.86 | 0.632 |
| $K_2O$ | 0.22 | 0.043 | 0.17 | 0.038 |
| Total | 82.06 | 15.132 | 82.67 | 15.068 |

Number of ions are calculated on the basis of 22 O, ignoring $H_2O^+$

EXAMPLE 2

XRD Studies:

For powder diffraction study, the ground sample was sieved through 40 micron filter to obtain uniform sized material. Less than 2 micron clay fraction was separated by centrifuging and filtration. Air dried and ethylene glycol treated samples mounted on low back-ground quartz plate were subject X-ray diffraction study. The diffraction patterns were obtained by Philips diffractometer and Siemens D-5000 powder diffractometer with HOPG graphite monochromator. Air dried sample exhibits a strong d (001) line at 1.54 nm and weak lines at 0.510 nm, 0.378 nm, and 0.308 nm. These correspond to (002), (003), (004) and (005) Bragg reflections respectively. These data are in good agreement with the published data of saponite (JCPDS card No. 29-1491), with unit cell parameters a=0.52 nm, b=0.92 nm and c=1.54 nm. XRD patterns of randomly oriented samples show d (060) value of 0.1532±0,0005 nm yielding bo=0.9275±0.002 nm.

EXAMPLE 3

For chromium-adsorption measurements, clay sample was taken in a 15 ml centrifuge tube, to which 0.04 M potassium dichromate solution was added. The contents were agitated for 1 to 3 hour, and subsequently heated to 200° C. The suspended particles were dried and analyzed for determining the valence-state of adsorbed chromium adopting XPS method. XPS measurements were conducted with Kratos XPS Axis 165 spectrometer equipped with a hemispherical energy analyzer. The non-monochromatized Mg-$K\alpha$ X-ray source (h$\upsilon$=1253.6 eV) was operated at 5 kV and 15 mA with pass energy of 80 eV, and an increment of 0.1 eV. The samples were out gassed for several hours in the XPS chamber to minimize air contamination to sample surface. In order to overcome the charging problem, charge neutralizer of 2 eV was applied and the binding energy of C 1s core level (B.E.=284.6 eV) of adventitious hydrocarbon was taken as standard. The obtained XPS spectra were fitted using a non-linear square method with the convolution of Lorentzian and Guassian functions after the polynomial background subtraction from the raw spectra.

The narrow scan of $Cr^2p$ for the Killari saponite treated with dichromate solution is show two weak peaks at binding energies 587.9 eV (0.2 of the total Cr) and 577.7 eV corresponding to Cr (VI) and very strong peaks at 585.6 eV (0.8 of the Total Cr) and 576.0 eV (0.78 of total Cr) corresponding to Cr (III) are observed. It is clear from the intensity of the peaks in FIG. 1, that the clay sample not only adsorbs the Cr(VI), but also reduces it by about 80% to Cr (III). It is also observed that the ferrous iron in the clay sample has got oxidized to ferric state following the treatment with dichromate solution. The samples treated with dichromate solutions show two pears for Fe $^2p_{3/2}$ at 710.9 eV and 71.3.0 eV, which are ascribed to $Fe^{2+}$ and $Fe^{3+}$ oxidation states. Similarly the two Cr $^2p_{3/2}$ peaks observed are attributed to $Cr^{3+}$ and $Cr^{6+}$ oxidation states. The XPS studies on the Killari saponite shows that it is capable of reducing Cr (VI) to Cr (III). The ferrous saponite in Deccan flood basalts could be useful in environmental management in areas affected by Cr(VI) effluents.

The Main Advantages of the Present Invention Are

1. A simpler method for the removal of toxic chromium from water
2. It basis for utilization of ferrous saponite in environmental management.
3. The conversion of Cr (VI) to Cr (III) is quantified by the peak area intensity.
4. Work-up procedure is very simple.
5. The present method does not involve any expensive chemical and hence economical.
6. The present method is environmentally safe.

We claim:

1. A process for the adsorption and subsequent reduction of hexavalent chromium to remove chromium from water, which comprises,
   a) contacting an aqueous dichromate solution containing hexavalent chromium with a ferrous-saponite clay having the formula $\{Na_{0.60}K_{0.40}Ca_{0.47}\}$ $[Mg_{2.05}Fe^{2+}_{3.95}]$ $(Si_{6.45}Al_{1.55})$ $O_{20}(OH)_4$; and
   b) heating the mixture of the aqueous dichromate solution containing hexavalent chromium and the ferrous-saponite clay to a temperature between 50° C. and 200° C. for a period of from 1 to 3 hours.

2. The process as claimed in claim 1 wherein the particle size of the ferrous-saponite clay is in the range of 0.1-5 μm.

3. The process as claimed in claim 1 wherein the clay fraction is separated by centrifugation and filtration.

4. The process as claimed in claim 1 wherein the concentration of the aqueous dichromate solution is 0.04 M.

5. The process as claimed in claim 1 wherein the clay is formed under reducing conditions.

6. A process for the simultaneous adsorption and reduction of hexavalent chromium to remove chromium from water, which comprises reacting an aqueous dichromate solution containing hexavalent chromium that is at a temperature between 50° C. and 200° C. with a ferrous-saponite clay having the formula $\{Na_{0.60}K_{0.40}Ca_{0.47}\}$ $[Mg_{2.05}Fe^{2+}_{3.95}](Si_{6.45}Al_{1.55})$ $O_{20}(OH)_4$ for a period of from 1 to 3 hours.

7. The process as claimed in claim 6 wherein the particle size of the ferrous-saponite clay is in the range of 0.1-5 μm.

8. The process as claimed in claim 6 wherein the clay fraction is separated by centrifugation and filtration.

9. The process as claimed in claim 6 wherein the concentration of the aqueous dichromate solution is 0.04 M.

10. The process as claimed in claim 6 wherein the clay is formed under reducing conditions.

\* \* \* \* \*